United States Patent
Ido et al.

(10) Patent No.: US 7,376,804 B2
(45) Date of Patent: *May 20, 2008

(54) STORAGE SYSTEM, BACKUP SYSTEM, AND BACKUP METHOD

(75) Inventors: Takeshi Ido, Odawara (JP); Kiichiro Urabe, Isehara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/375,400

(22) Filed: Mar. 15, 2006

(65) Prior Publication Data

US 2006/0179122 A1    Aug. 10, 2006

Related U.S. Application Data

(63) Continuation of application No. 10/784,999, filed on Feb. 25, 2004, now Pat. No. 7,114,046.

(30) Foreign Application Priority Data

Jun. 27, 2003    (JP) .............................. 2003-183742

(51) Int. Cl.
*G06F 12/16* (2006.01)
(52) U.S. Cl. ..................................... 711/162; 711/112
(58) Field of Classification Search ..................... None
See application file for complete search history.

(56) References Cited

U.S. PATENT DOCUMENTS

| | | | |
|---|---|---|---|
| 5,544,347 A | 8/1996 | Yanai et al. ................. | 711/162 |
| 6,643,667 B1 | 11/2003 | Arai et al. .................... | 707/200 |
| 6,880,059 B2 | 4/2005 | Mixuno et al. .............. | 711/170 |
| 6,886,086 B2 | 4/2005 | Kobayashi et al. ......... | 711/162 |
| 7,114,046 B2 * | 9/2006 | Ido et al. ..................... | 711/162 |
| 2001/0014956 A1 | 8/2001 | Nagata et al. .................. | 714/8 |
| 2002/0199073 A1 | 12/2002 | Tamura et al. .............. | 711/162 |
| 2003/0088592 A1 * | 5/2003 | Innan et al. ................. | 707/204 |
| 2004/0010732 A1 | 1/2004 | Oka ............................ | 714/13 |
| 2004/0044744 A1 | 3/2004 | Grosner et al. ............. | 709/217 |
| 2004/0073675 A1 | 4/2004 | Honma et al. .............. | 709/226 |
| 2004/0078419 A1 | 4/2004 | Ferrari et al. ............... | 709/201 |
| 2004/0254962 A1 | 12/2004 | Kodama et al. ............ | 707/201 |
| 2004/0254964 A1 * | 12/2004 | Kodama et al. ............ | 707/204 |

FOREIGN PATENT DOCUMENTS

| | | |
|---|---|---|
| EP | 1058190 | 5/2000 |
| JP | 20027304 | 1/2002 |

* cited by examiner

*Primary Examiner*—Denise Tran
(74) *Attorney, Agent, or Firm*—Mattingly, Stanger, Malur & Brundidge, P.C.

(57) ABSTRACT

A storage controller can perform backup processing without proceeding via a server and without the need for the server to grasp the state of pair volumes. When an instruction for backup is given from the server while data is being copied from a source volume to a target volume, the storage controller transfers the data to a backup device using differential information between the pair volumes after waiting until data about a range to be backed up and instructed by the server is copied into the target volume.

12 Claims, 11 Drawing Sheets

STORAGE SYSTEM, BACKUP SYSTEM, AND BACKUP METHOD

CROSS-REFERENCE TO RELATED APPLICATION

The present application is a continuation of application Ser. No. 10/784,999, filed Feb. 25, 2004, now U.S. Pat. No. 7,114,046, and relates to and claims priority from Japanese Patent Application No. 2003-183742, filed on Jun. 27, 2003, the entire disclosure of which is incorporated herein by reference.

BACKGROUND OF THE INVENTION

The present invention relates generally to the backup of information stored in a storage system, and, more particularly, to server-free backup of information on a storage area network (SAN).

As computer systems have treated an increasing amount of information in recent years, there is an increasing need for backing up such information. Thus, there is a tendency for the load imposed on backup processing of a server to be increased. Where a server backs up a large amount of data, the data is read from a storage system with which a source storage device to be backed up is connected, and then the data is written into a target backup device, such as a tape library, for example.

However, as the amount of data increases, the server resources (e.g., host bus adapter) used for the backup are occupied for a longer time. Thus, if another application program tries to use this host bus adapter to send and receive other data during this interval, the processing has to wait for a long time or the performance deteriorates greatly.

One means for alleviating the burden imposed on a server's backup processing to solve the above-described problems involves the backup of data using an Extended Copy command.

On the other hand, in an application where there is a large amount of I/O processing to and from a storage volume, in a case where the server issues a splitting instruction to pair volumes, an update copy from the source volume to the target volume may not be immediately ended. Rather, some time is taken until a split state is reached. To solve this problem, there is a technique that is available. In particular, when a server issues a splitting instruction to pair volumes, a storage controller continues an update copy to the target volume, while responding to the server that the pair volumes are in a split state.

Patent Reference 1: JP-A-2001-222355

Patent Reference 2: JP-A-2002-366310

However, where data is transferred to a backup device that is different from the server, it is only assured that the data in the storage device will be transferred to the server. Therefore, the consistency between the data transferred from the target volume to the backup device and the data in the source volume is not assured.

Furthermore, if a backup is performed after waiting until data to be updated is completely reflected in the target volume from the source volume, the server waits without being capable of giving an instruction for start of backup processing until the data to be updated is completely reflected in the target volume. The server needs to monitor the split state.

SUMMARY OF THE INVENTION

Accordingly, it is an object of the present invention to provide a technique which makes it possible to respond to a server that pair volumes are in a split state. The technique also assures consistency of data even in a case where the data is transferred to a backup device using a backup command, and it enables backup without urging the server's processing to wait.

A storage system that achieves this object has a storage controller and a storage device. The storage controller has a memory, together with first, second, third, and fourth control portions. The storage device has first and second storage units. The first control portion of the storage controller stores information into the first storage unit via the memory. The control portion that actually stores information into the storage unit is the third control portion. The first storage unit is a source volume. The second storage unit is a target volume. Furthermore, the third control portion stores information from the first storage unit into the second storage unit.

On the other hand, when an instruction for pair splitting is given from the server, the storage controller writes differential information between the first and second storage units into the memory. Also, the pair splitting is reported to the first server. Then, where a backup command is subsequently received from the second server, the fourth control portion transfers data to be backed up to a backup device based on the differential information between the pair volumes.

DESCRIPTION OF THE PREFERRED EMBODIMENTS

The present invention will be hereinafter with reference to the drawings.

First Embodiment

Figure 1:
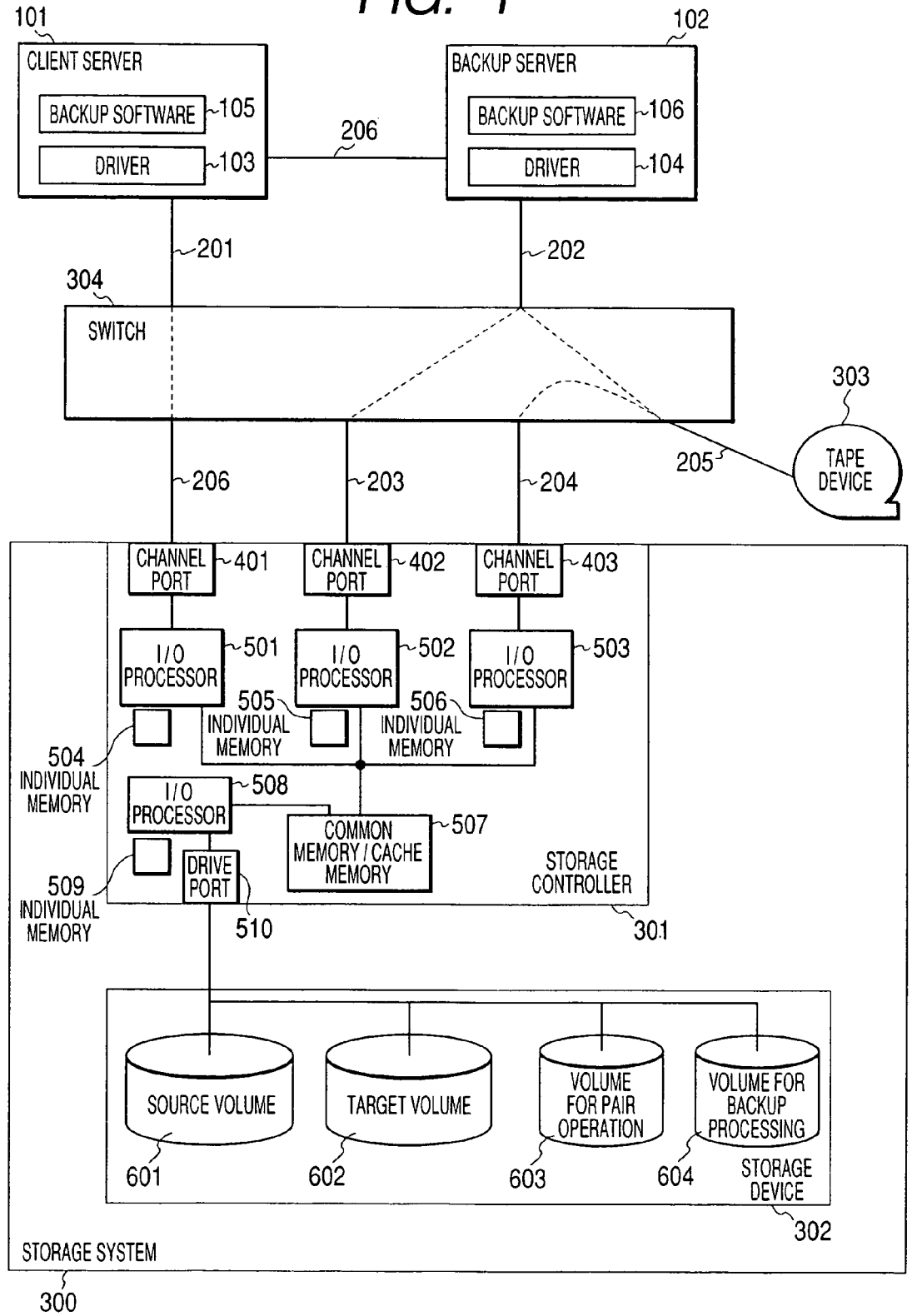
FIG. 1 is a block diagram of a client server, a backup server, and a storage system.

FIG. 1 is a diagram showing the configuration of a storage system 300 in a first embodiment of the present invention.

In the storage system 300, a storage controller 301 is connected with a client server 101 via a switch 304 by paths 201 and 206, and it controls I/O processing required from the client server 101. Similarly, the storage controller 301 is connected with a backup server 102 via the switch 304 by paths 202 and 203, and it controls I/O processing required from the backup server 102. Furthermore, the storage controller 301 is connected by paths 204 and 205 via the switch 304 with a tape device 303, that constitutes a backup device, and it controls I/O processing to and from the tape device 303. The client server 101, backup server 102, storage controller 301 and backup device 303 are connected via the switch 304. The switch 304 controls the route of the paths. For example, when the client server 101 issues a command to a channel port 401, the command sent from the client server 101 via a path is analyzed in terms of the destination address by the switch 304. The shortest route is selected and the command is routed. In this case, the command reaches the channel port 401 via the path 206.

The client server 101 and backup server 102 are connected by the LAN 206. The servers 101 and 102 communicate with each other to control the parameters/timing of commands of pair split and instruction commands for backup. The pair splitting commands and instruction commands for backup are issued from backup software 105 and 106, and they are sent to the storage controller 301 via drivers 103 and 104, respectively. The processing of the client server 101 and backup server 102 may be performed all by the client server 101. Conversely, the backup server 102 may perform all of the processing of the client server 101.

The storage controller 301 has I/O processing control portions (I/O processors) 501-503 for performing I/O processing with the client server 101 and backup server 102 via the channel ports 401-403. Also, the storage controller 301 has an I/O processing control portion (I/O processor) 508 for performing I/O processing with volumes. The, I/O processors 501-503 and 508 can operate independently. For example, the I/O processor 501 performs I/O processing from the client server 101. On the other hand, the I/O processor 508 independently performs I/O processing between a common memory/cache memory 507 and a storage device 302. The common memory/cache memory 507 is a memory that can be accessed from the I/O processors 501-503.

The I/O processors 501-503 and 505 have individual memories 504-506 and 509, respectively, that store respective control information. These individual memories cannot be accessed from plural I/O processors. In contrast, the common memory/cache memory 507 can temporarily store data from servers and data from the storage device 302, as well as control information that can be shared among the I/O processors 501-503 and 508.

The storage device 302 that is connected with the storage controller 301 has a source volume 601, a target volume 602, a volume 603 for pair operation, and a volume 604 for backup processing. The I/O processor 508 directly performs I/O processing on each volume of the storage device 302. For instance, where the I/O processor 501 writes Write data from the client server 101 into the source volume 601, the I/O processor 501 once stores the Write data into the common memory/cache memory 507. At this stage, the I/O processor 501 reports completion of writing to the client server 101. Then, the I/O processor 501 performs other I/O processing. Meanwhile, the I/O processor 508 performs polling- at regular intervals on the common memory/cache memory 507. Where the Write data is stored in the common memory/cache memory, the I/O processor 508 writes the Write data into the source volume 601. Because of the above-described I/O processing, I/O processing including reading and writing is performed between the client server 101 and source volume 601.

When the source volume 601, in which the data in the client server 101 has been stored, is backed up to the tape device 303, it is necessary to create a copy of the source volume 601 into the target volume 602 within the storage device 302, because if the storage controller 301 attempts to perform a backup from the source volume to the tape device directly, the I/O processing from the client server 101 that is normal processing becomes deteriorated. Alternatively, it is necessary to stop the I/O processing.

The source volume 601 and target volume 602 that form a pair of volumes can take the following states:

(1) Simplex state: A pair of a source volume and a target volume is not formed.

(2) Duplex pending state (transient duplex state): After a source volume and a target volume form a pair, creation copy processing and update copy processing are carried out or might be carried out. The creation copy process referred to herein involves a copy of data from the source volume to the target volume and occurs when a copy of data from the source volume to the target volume is started, but both are not yet in a fully mirrored state. On the other hand, the update copy process involves a copy of data from the source volume to the target volume and occurs when data is written into the source volume either before the source and target volumes assume a fully mirrored state or after they have reached a fully mirrored state.

(3) Duplex state: After source and target volumes form a pair, the creation copy process is complete, and the source and target volumes are in a fully mirrored state. However, an update copy of data from the source volume to the target volume might be carried out.

(4) Split state: This is a state obtained after the pair of source and target volumes has been split.

(5) Split pending state (transient split state): After the pair of source and target volumes has been split, differential data that is to be updated from the source volume to the target volume still exists. An update copy process is carried out.

Figure 2:
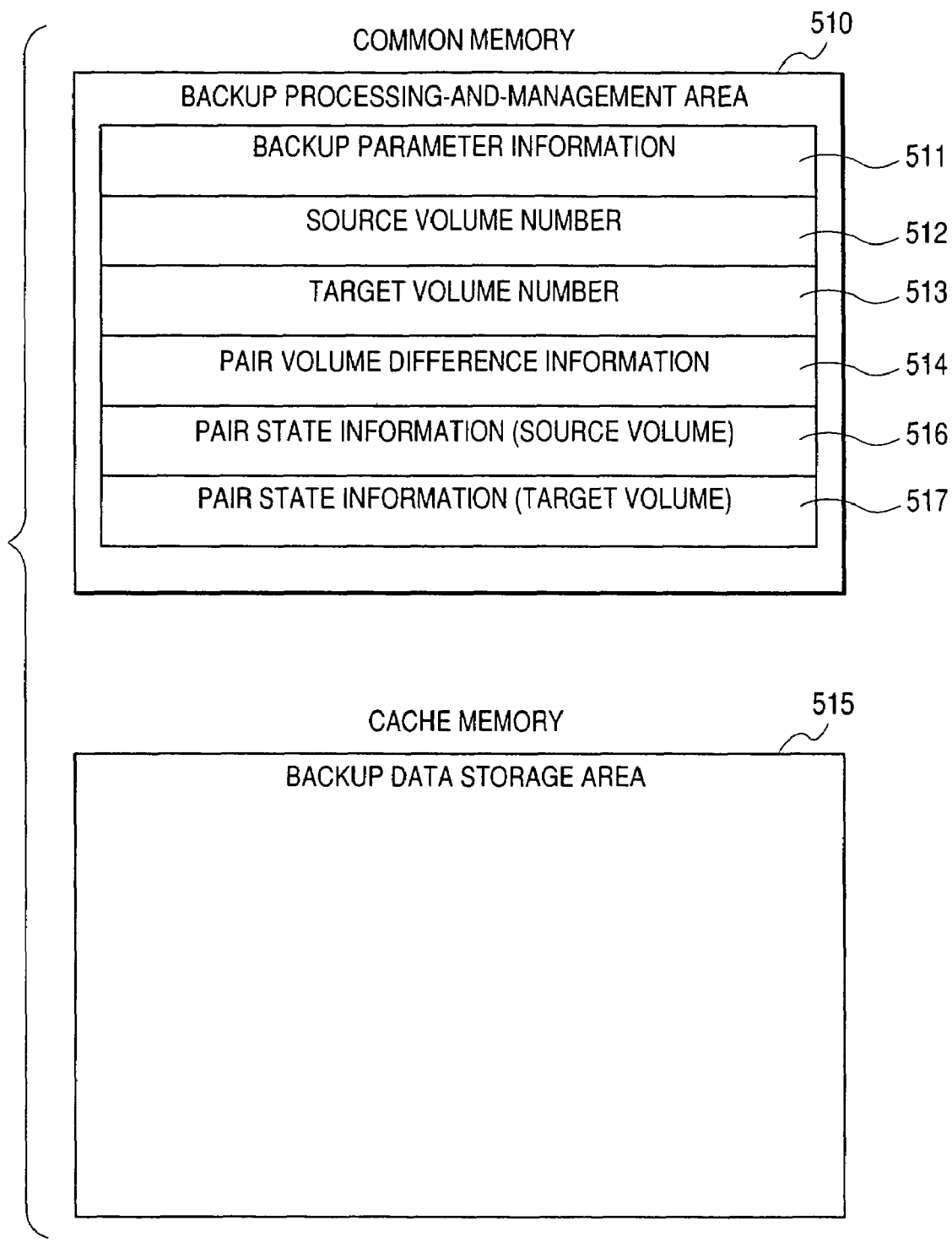
FIG. 2 is a diagram showing a table on a common memory necessary to check backup processing and differential data between pair volumes, as well as a data storage area.

A copy process can be performed from a source volume to a target volume by making transitions between the above-described states. In the present embodiment, assignments to the source volume 601 and target volume 602 are stored in source volume number 512 and target volume number 513 of the common memory/cache memory 507 shown in FIG. 2. Furthermore, a backup processing-and-management area 510, that is managed by the common memory/cache memory 507, has the following: backup parameter information 511 for storing parameter information about a backup, source volume number 512, target volume number 513, pair volume difference information 514, pair state information (source volume) 516, and pair state information (target volume) 517. In addition, the cache memory has a backup data storage area 515 for storing backup data read from a specified area. The pair state information (source volume) 516 and pair state information (target volume) 517 are available as means for knowing whether differential data is reflected or not. If a pair split is performed, the pair state information (source volume) 516 immediately becomes "pair split", but the pair state information (target volume) 517 remains in "transient pair split" state until the differential data is reflected in the target volume. Therefore, it is possible to know whether the differential data has been reflected, from this information, the storage controller 301, and servers 101, 102.

Figure 3:
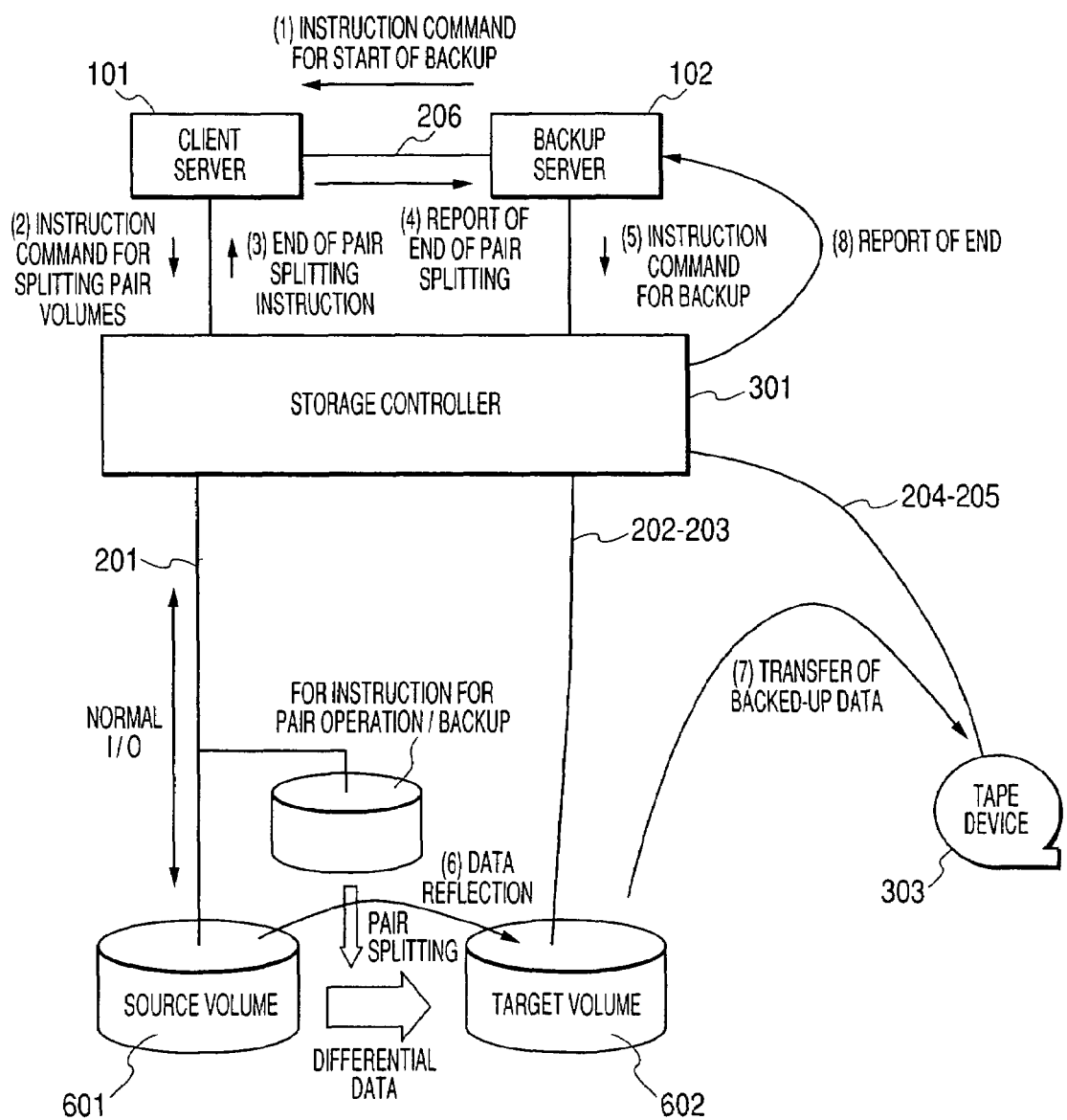
FIG. 3 is a conceptual block diagram of a first embodiment.

FIG. 3 is a conceptual block diagram illustrating a summary of the backup processing in the present embodiment. For the sake of simplicity, the switch 304, I/O processors 501-503, 508, etc. are omitted in FIG. 3. The storage controller 301 is a conceptual diagram of backup processing in a case where differential data from the source volume 601 to the target volume 602 exists after the pair volumes have been split. If an instruction command for backup is issued from the backup server 102 after the pair splitting, the storage controller 301 checks to see if differential data remains in the range to be backed up. Where differential data remains, the storage controller 301 reflects the differential data concerning the portion to be backed up in the target volume 602 and then transfers the backed-up data to the tape device 303. This permits the processing to proceed without producing a wait time in the backup processing.

Figure 4:
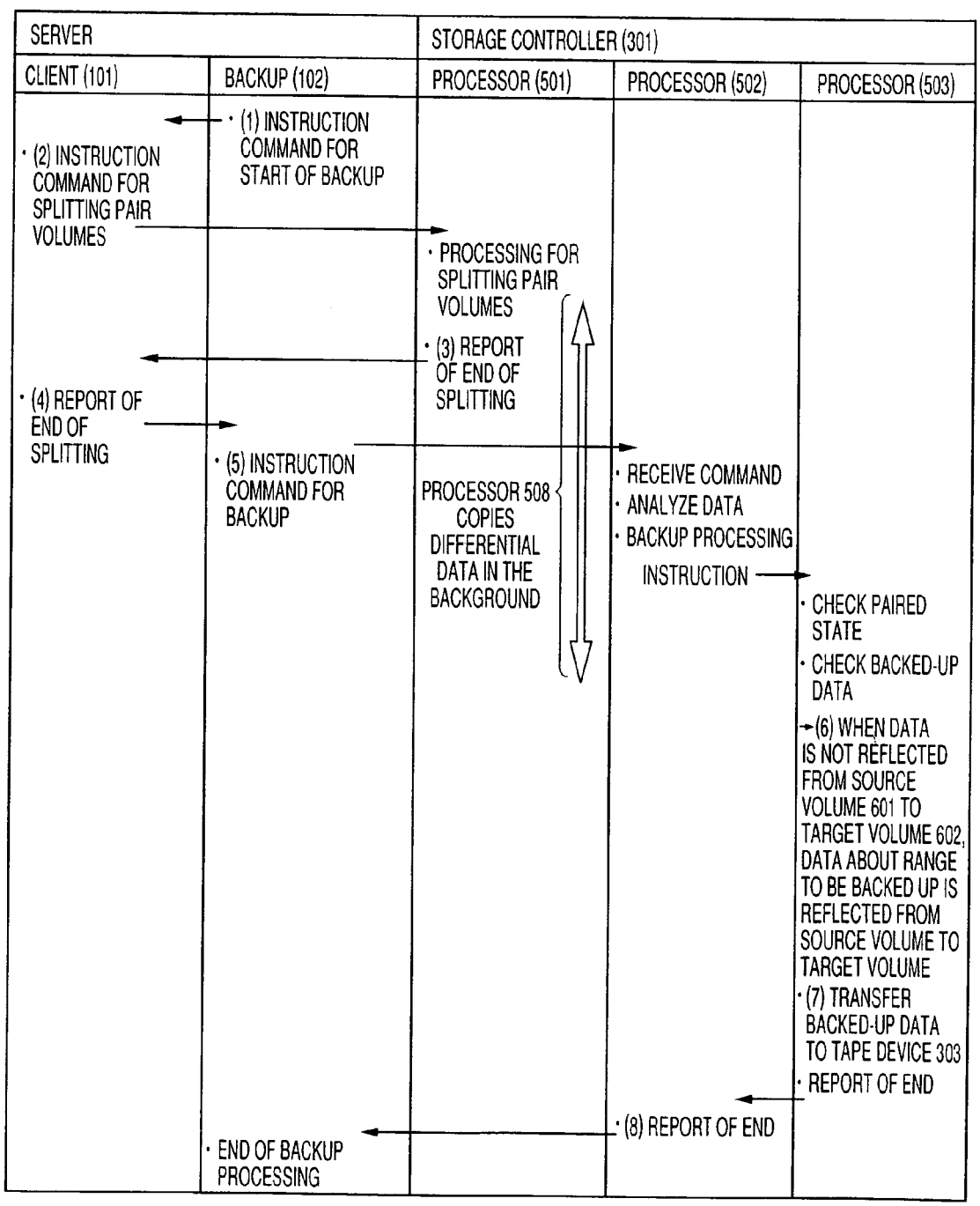
FIG. 4 is a flowchart of the processing carried out in the first embodiment.

FIG. 4 is a flowchart illustrating a summary of the processing carried out in the present embodiment. It is assumed that a creation copy or update copy is made from a source volume to a target volume. (1) The backup server 102 issues an instruction command for starting a backup to the client server 101. (2) The client server 101 receiving the command issues an instruction command for splitting the pair volumes to the I/O processor 501. Then, the I/O processor 501 causes the pair state information (source volume) 516 to pair split. (3) Also, the I/O processor 501 reports the end of the splitting of the pair volumes to the client server 101. In this state, pair state information (target volume) 517 is in a pending pair split state. Subsequently, the processor 501 issues a command to the processor 508 based on the pair volume difference information 514 to perform a copy of data from the source volume to the target volume. The I/O processor 508 receiving the command executes a copy of data into the target volume 602 according to the pair volume difference information 514 that manages the data not reflected from the source volume 601 to the target volume 602 at the instant of the pair splitting, until the data in the source volume 601 agrees with the data in the target volume 602. Here, the processor 508 operates independently of the processing of the processors 501-503.

Meanwhile, (4) the client server 101 receiving the report of the end of the splitting reports the completion of the splitting of the pair volumes to the backup server 102. (5) The backup server 102 receiving the report of the completion of the splitting of the pair volumes issues an instruction command for backup to the I/O processor 502. The processor 502 receiving the instruction command for backup analyzes the backup instruction command and stores the results of the analysis in the backup parameter information 511. An example of this backup parameter information includes parameters of an Extended Copy command that is a SCSI standard. Volume information about the source volume, volume information about the backup destination, and information describing the range backed up are contained in the parameters. Then, an instruction command for the backup is reported to the processor 503. Here, the I/O processors 502 and 503 are assigned to two I/O processors and the I/O processing is performed to distribute the load. Also, the channel ports are divided into two, i.e., channel ports 402 and 403, to secure the communication bandwidth for the paths.

The I/O processor 503, upon receiving the Backup instruction command from the I/O processor 502, checks the pair volume difference information 514 to confirm whether all of the range to be backed up or each unit of data to be written into the backup device has been copied from the source volume 601 to the target volume 602 by referring to the backup parameter information 511. Where the differential data about the range to be backed up does not exist in the pair volume difference information 514, the processor 503 reads data to be backed up from the target volume into the cache memory. Then, backup to the tape device 303 is started. Meanwhile, (6) where the I/O processor 503 refers to the backup parameter information 511 and the differential data about the range to be backed up is present in the pair volume difference information 514, the I/O processor 503 gives an instruction to the I/O processor 508 to copy the differential data. The I/O processor 508 receiving the instruction performs a copy operation with a priority on the differential data about the range to be backed up. After the completion of the copy operation, the I/O processor 508 reports the completion of the copy of differential data about the range to be backed up to the I/O processor 503.

(7) The I/O processor 503 receiving the report backs up the data about the range to be backed up to the tape device 303. After completion of the backup, the processor 503 reports the end of the backup to the processor 502. (8) The processor 502, upon receiving the report of the end, reports the end of the backup to the backup server 102, thus ending the backup.

After the end of the backup, the I/O processor 508 continues to copy until a duplex state is reached, i.e., the source and target volumes agree in data content.

The present embodiment makes it unnecessary for the backup server 102 to wait for pair splitting of the target volume 602. Furthermore, the backup server 102 does not need to monitor the state of the pair splits. Hence, the load on the backup server 102 can be reduced.

Second Embodiment

Figure 5:
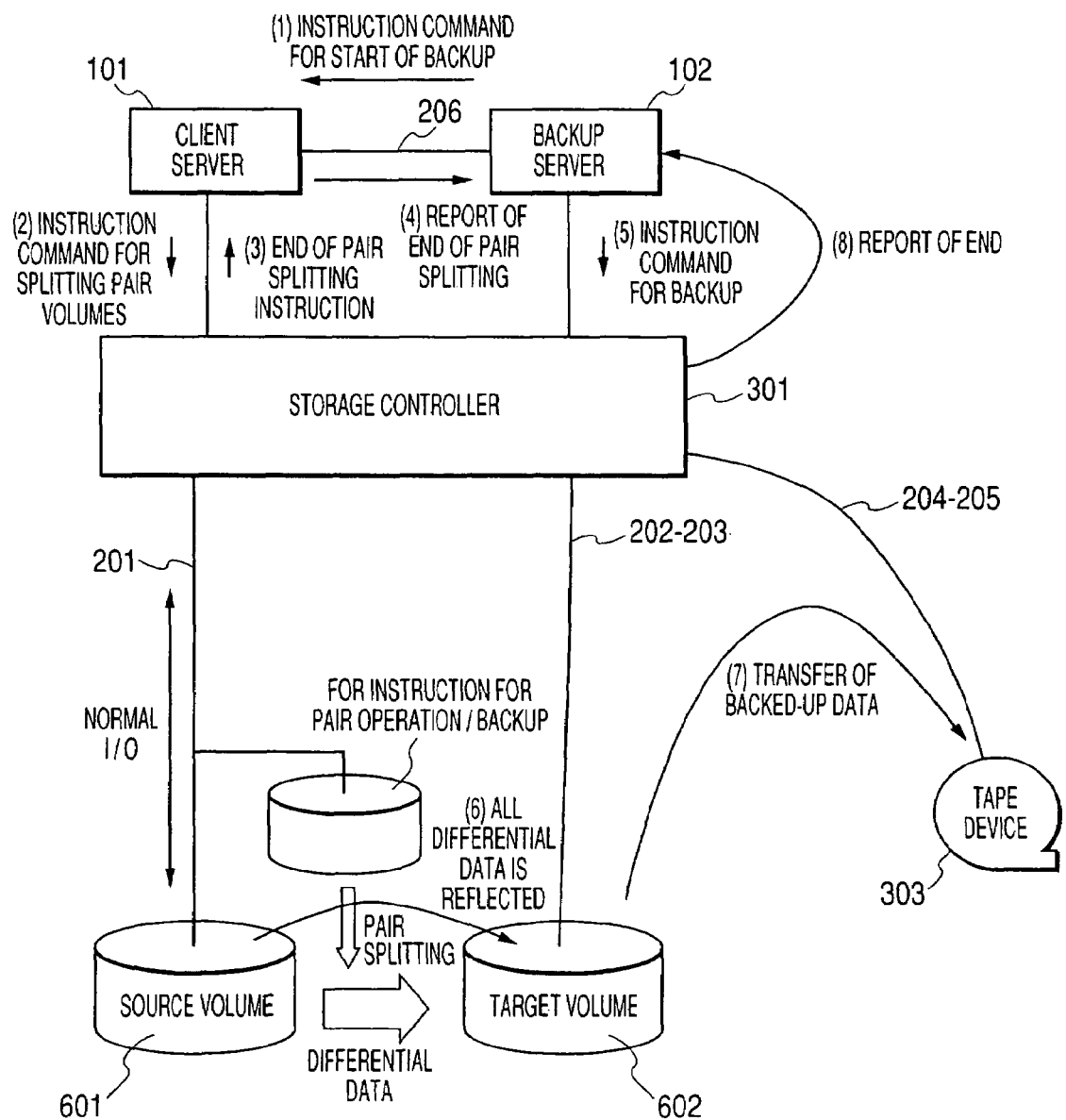
FIG. 5 is a conceptual block diagram of a second embodiment.

FIG. 5 is a conceptual block diagram of backup processing in accordance with a second embodiment. After pair splitting, if the backup server 102 issues an instruction command for backup, the storage controller 301 checks to see if differential data remains in the range to be backed up. Where differential data remains, the I/O processor 503 makes the backup command wait until all the differential data has been copied into the target volume 602. As a result, it takes a long time until the backup processing is completed, but the processing in the storage controller 301 is made simpler. In addition, the backup processing can be made to proceed without the client server 101 and backup server 102 monitoring the state of the target volume 602.

Figure 6:
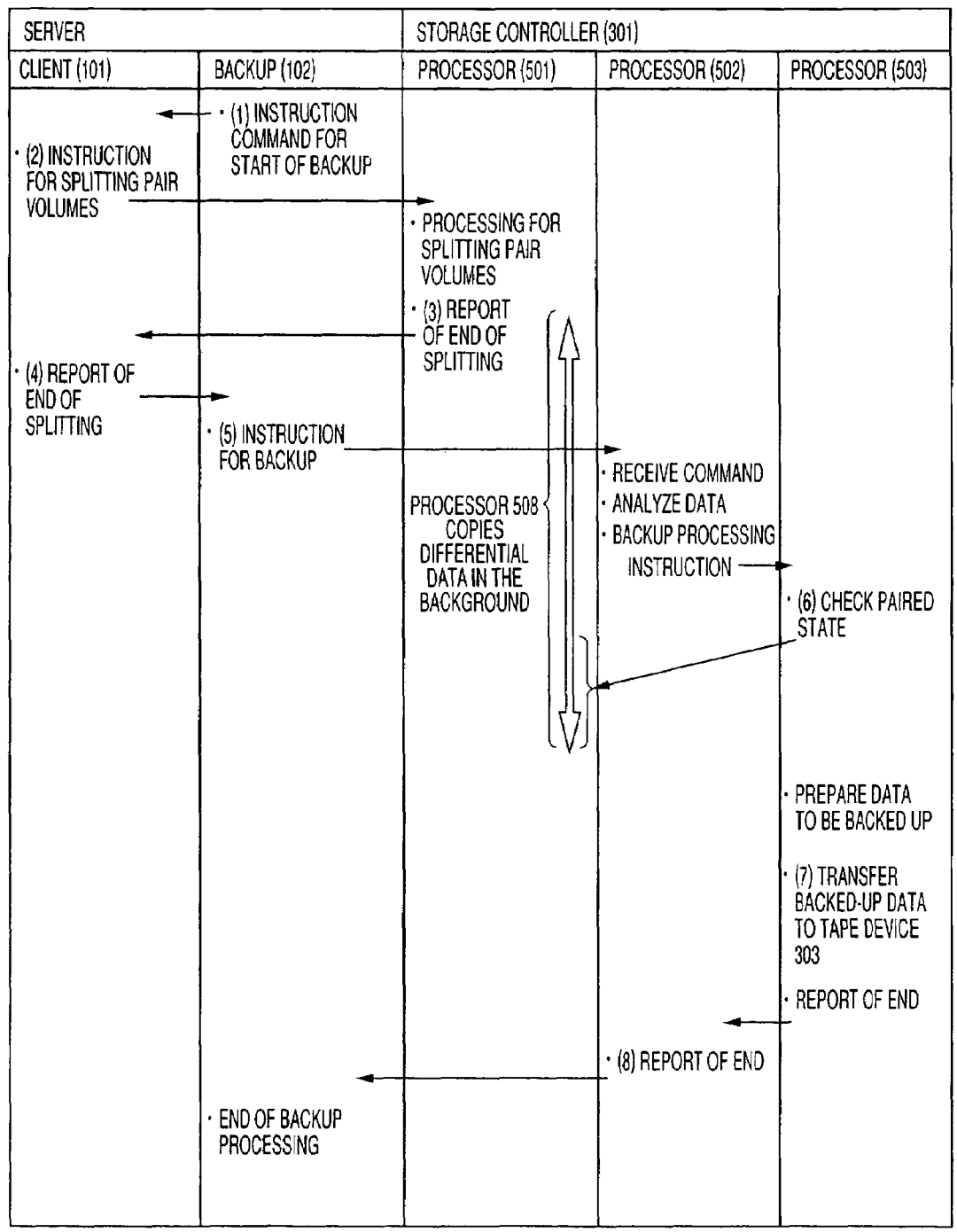
FIG. 6 is a flowchart of the processing carried out in the second embodiment.

FIG. 6 is a flowchart illustrating a summary of the processing. The processing is almost identical with the first embodiment. The difference from the first embodiment is that the I/O processor 503 monitors the state of reflection of the differential data between the pair volumes and starts backup processing after all of the differential data has been reflected in the target volume.

Figure 7:
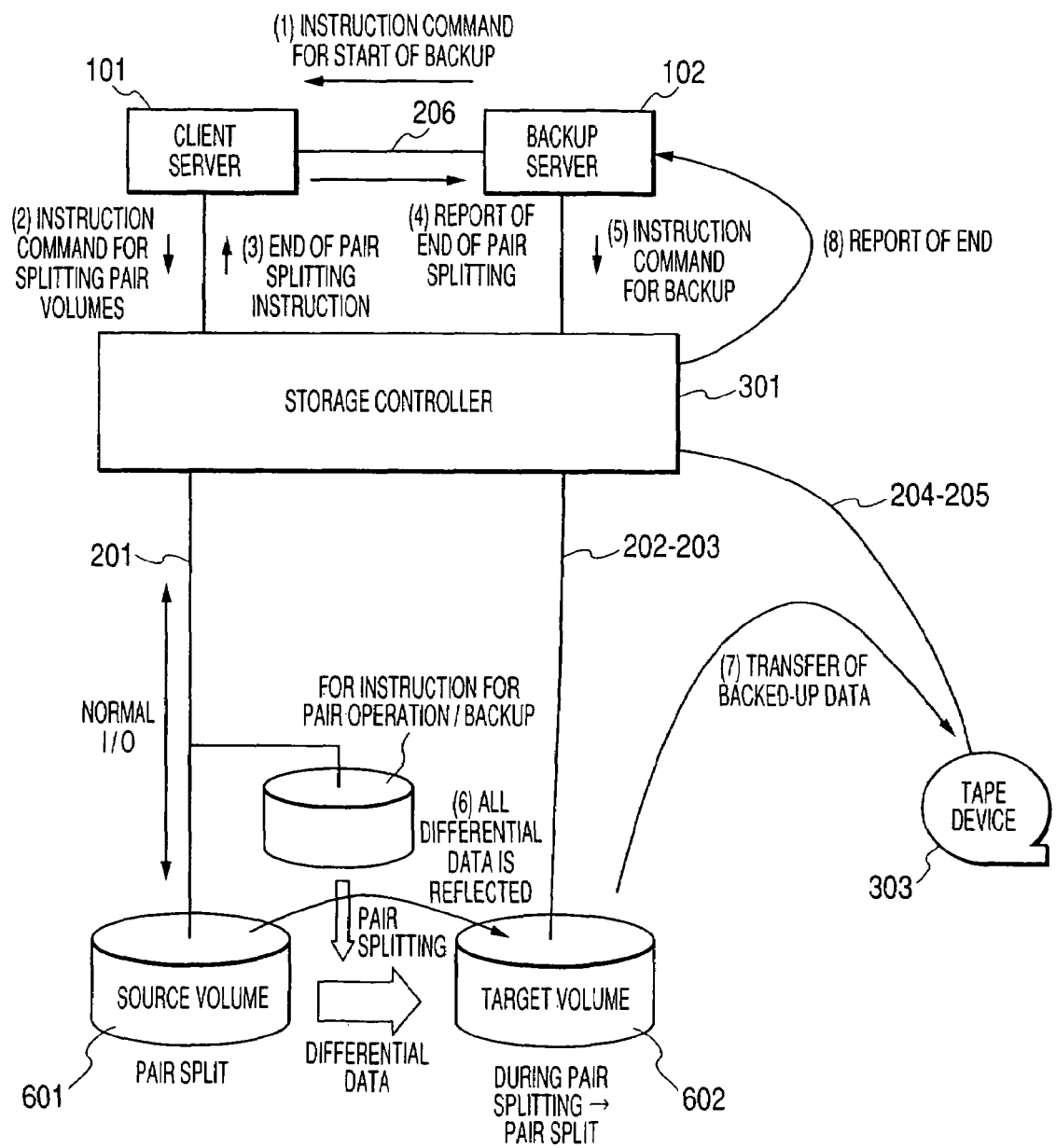
FIG. 7 is a conceptual block diagram of a third embodiment.

FIG. 7 shows a modification of the present embodiment, illustrating processing in a case where the backup software 106 for the backup server 102 monitors the differential data, instead of the storage controller 301 in FIG. 5. In FIG. 5, after pair splitting, the source volume 601 of the pair of volumes quickly assumes a state of "pair split". On the other hand, the target volume 602 remains in the "pending-split state" until all of the differential data is reflected in the target volume. Therefore, it is impossible to perform backup processing. However, the backup server 102 can check to see whether or not the differential data is reflected in the target volume 602. Therefore, the server periodically checks the state. After confirming that the "pair split state" has been reached, the backup server 102 can issue a Backup Start command. In this modified embodiment, the backup server 102 can control the backup processing instead of monitoring the state of the target volume 602 by the I/O processor 503.

Third Embodiment

Figure 8:
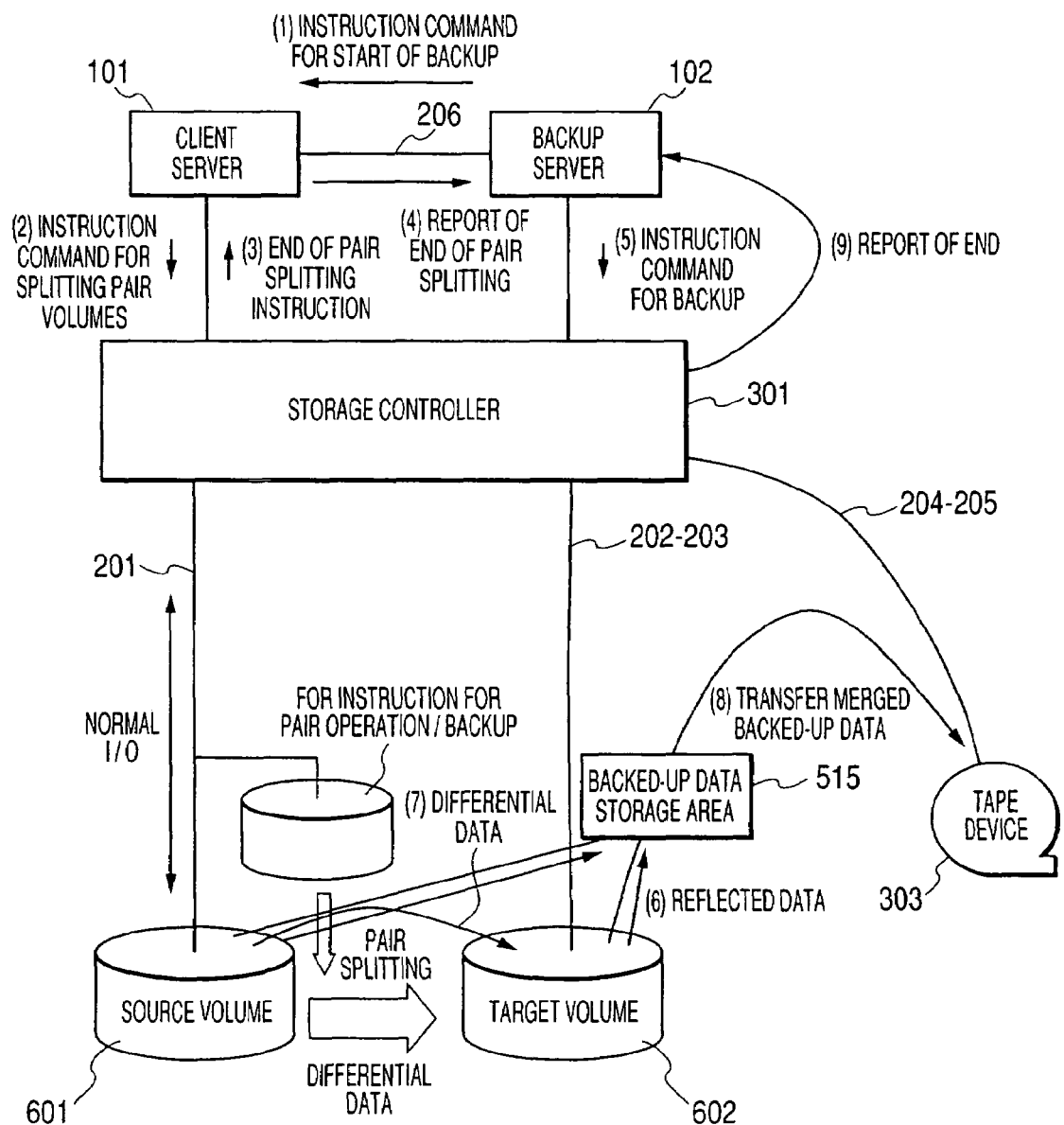
FIG. 8 is a conceptual block diagram showing a modification of the third embodiment.

FIG. 8 is a conceptual block diagram illustrating the manner in which backup processing is performed using the backup data storage area 515 in a case where differential data exists from the source volume 601 to the target volume 602 after the pair volumes have been split in backup processing.

After pair splitting, if an instruction command for backup is issued from the backup server 102, the storage controller 301 checks to see whether differential data remains in the range to be backed up. Where differential data remains, the storage controller 301 reads the differential data concerning the portion to be backed up from the source volume 601 and once stores the data into the backup data storage area 515. Furthermore, if the data about the range to be backed up has been reflected in the target volume 602, the data is read into the backup data storage area 515 and merged with the data from the source volume 601. Then, the merged data is transferred to the tape device 303. Thus, even where there is differential data in the same way as in the first embodiment, the processing can be made to proceed without producing a wait time in the backup processing. Since differential data is not reflected in the target volume 602, the backup processing can be performed at a correspondingly higher rate.

Figure 9:
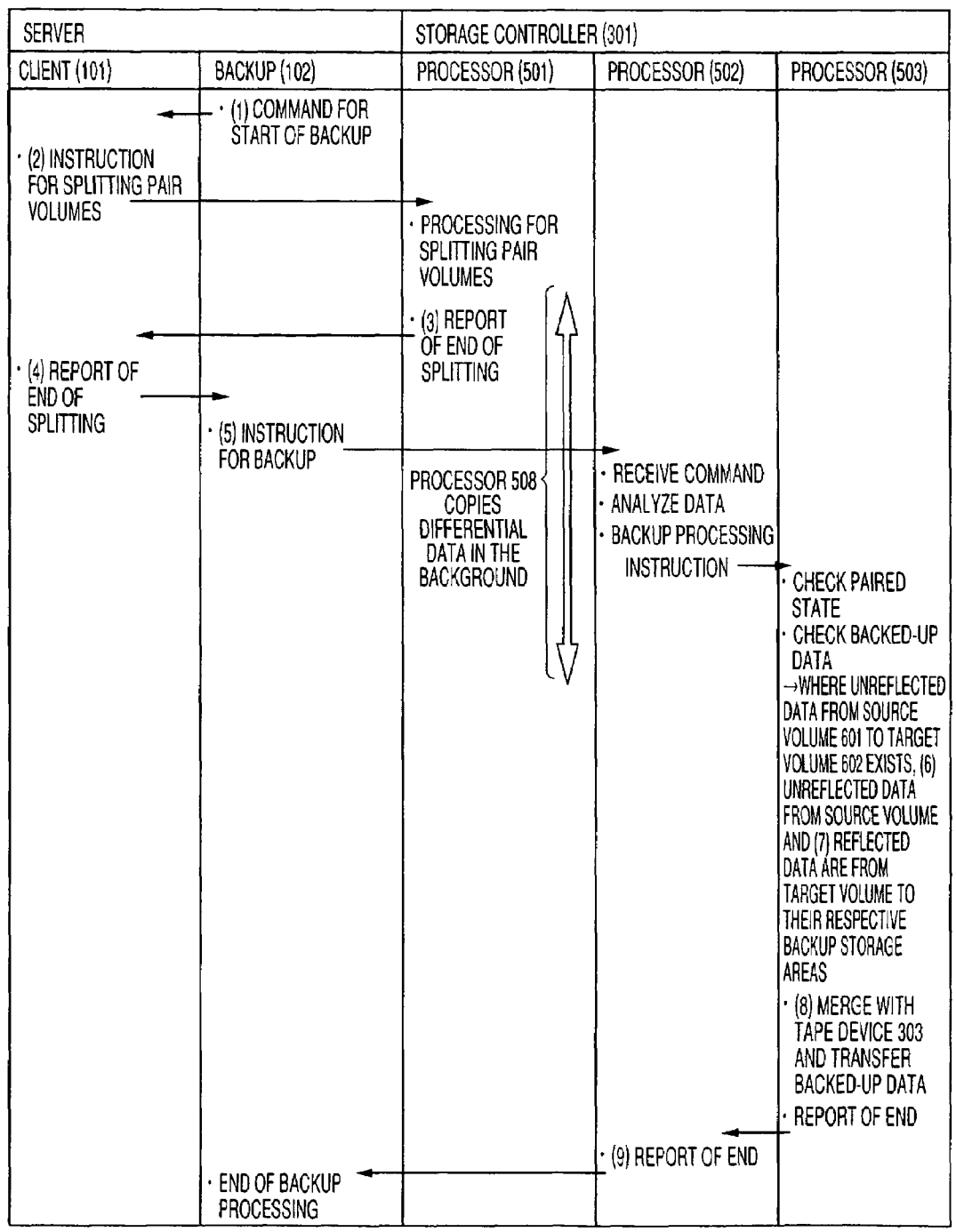
FIG. 9 is a flowchart of the processing carried out in the third embodiment.

FIG. 9 represents a flowchart illustrating a summary of processing in the present embodiment. The processing in the present embodiment is almost identical with the first embodiment. The differences are as follows. Where the I/O processor 503 checks the state of reflection of the differential data between the pair volumes and finds that the data is not reflected, data is read from the source volume 601 to the backup data storage area 515. After data about the range to be backed up is fully read into the backup data storage area 515, the I/O processor 503 transfers data about the range to be backed up to the tape device 303. Meanwhile, where data about the range to be backed up all exists in the target volume, the I/O processor 503 reads the data about the range to be backed up from the target volume 602 into the backup data storage area 515 and then transfers the data to the tape device 303. Where the differential data is not reflected in the target volume, data is stored directly into the backup data storage area 515 without writing the data into the target volume 602 by this method and so data about the range to be backed up can be prepared quickly.

Fourth Embodiment

Figure 10:
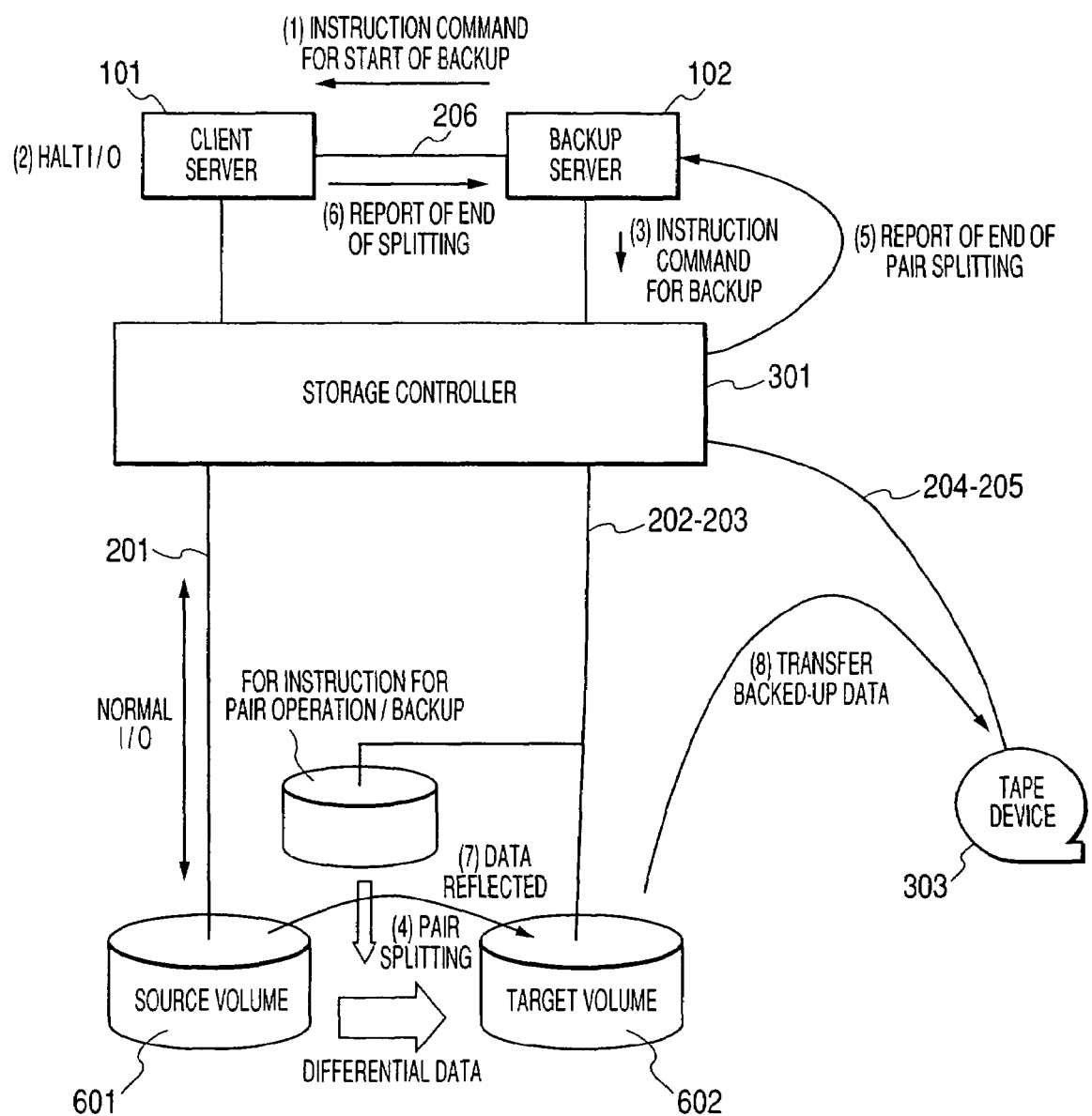
FIG. 10 is a conceptual block diagram of a fourth embodiment.

FIG. 10 is a conceptual block diagram illustrating processing in a case where a Pair Splitting instruction command and a Backup instruction command are combined into one command in backup processing. In the present embodiment, the client server 101 does not need to issue a Pair Splitting instruction command, unlike the aforementioned embodiments. Instead, the backup server 102 first reports the start of a backup to the client server 101 via the LAN 205. Because of this report, the client server 101 temporarily interrupts normal I/O processing and responds to the backup server 102 regarding the start of the backup. The backup server 102 subsequently issues a Backup instruction command to the storage controller 301 without monitoring the paired state of the volumes. On receiving the Backup command, the storage controller 301 gives an instruction for canceling the first specified paired state. At this instant, the controller responds to the Backup command. The backup server 102 receives the response from the storage controller 301 and makes a report for resumption of I/O processing to the client server 101. After receiving the report, the client server 101 resumes the I/O processing.

Meanwhile, the storage controller 301 that has given an instruction for pair splitting then reflects the differential data about the range to be backed up in the target volume 602 and transfers the backed-up data to the tape device 303. Because the backup server 102 monitors the state of the backup in the storage controller, the backup server 102 can know the end of the backup. For example, the backup server 102 checks the state by issuing a command for checking the status of backup processing, such as a Receive Copy Result command, to the storage controller 301.

Figure 11:
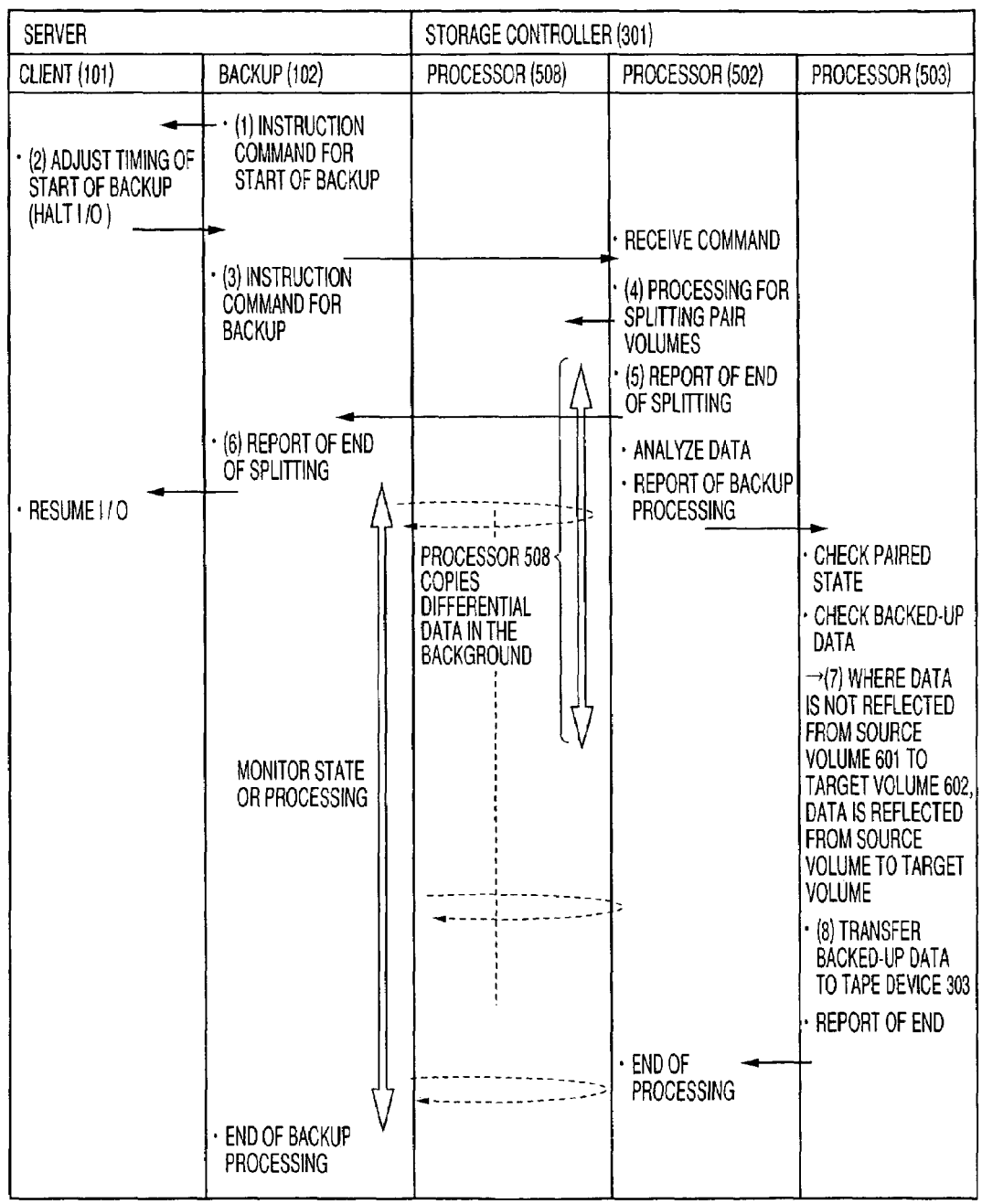
FIG. 11 is a flowchart of the processing carried out in the fourth embodiment.

FIG. 11 represents a flowchart illustrating the processing of FIG. 6 summarily. The backup server 102 issues an instruction command for starting a backup to the client server 101. The client server 101 receiving the Backup Start instruction interrupts the normal I/O processing temporarily. The normal I/O processing is interrupted because the processing for splitting the pair volumes is performed quickly. The client server 101 that has temporarily interrupted the I/O processing reports the interruption to the backup server 102. The backup server 102 receiving the report issues an instruction command for splitting pair volumes to the I/O processor 502. The I/O processor 502 receiving the Backup instruction command issues an instruction command for splitting pair volumes to the I/O processor 508. Then, the I/O processor 508 performs processing independently of the I/O processors 502 and 503 in the background and copies differential data into the target volume.

Meanwhile, the I/O processor 502 brings the pair state information (source volume) 516 into a pair split state and brings the pair state information (target volume) 517 into a pending split state and then reports the end of the splitting to the backup server 102. Furthermore, the I/O processor 502 makes a report of the Backup instruction command to the I/O processor 503. Where the differential data about the range to be backed up does not exist in the target volume, the I/O processor 503 reflects the differential data about the range to be backed up from the source volume to the target volume. Then, the I/O processor 503 transfers the data about the range to be backed up to the tape device 303. Other processing is almost identical with the processing in the first embodiment.

In the present embodiment, backup processing can be performed without for the client server 101 or backup server 102 monitoring the state of the pair volumes.

In the present embodiment, in a case where the data concerning the range to be backed up is not reflected in the target volume, the I/O processor 503 stores the data into the backup data storage area 515, and then it can transfer the data to the tape device 303. Furthermore, the I/O processor 503 can make the transfer to the tape device 303 wait until the differential data is fully copied into the target volume.

While the invention made by the present inventor has been described in detail based on various embodiments, it is obvious that the invention is not limited to the above-described embodiments, but can be modified variously without departing from the gist thereof.

For example, in accordance with the present invention, a LAN is used as the network between the client server 101 and backup server 102. The network is not limited to a LAN. It may also be a fiber channel, telephone network, wireless network, or the like.

In addition, in accordance with the invention, the I/O processor 508 is used for processing on the storage device 302. For this I/O processing, the I/O processors 501-503 can be used.

Furthermore, in accordance with the invention, the volume 603 for pair operation and the volume 604 for backup processing can be defined on the common memory/cache memory without using actual volumes.

Additionally, in accordance with the invention, the backup device is not limited to the tape device 303. It may also be another type of storage device, such as a disk device.

Further, in accordance with the invention, the client server 101 and backup server 102 can be combined into one server. Also, instead of a server, a host can be used.

According to the present invention, one can obtain the advantage that backup processing from a server can be performed after responding to the server that pair volumes have been split and maintaining the consistency in data between source and target volumes.

What is claimed is:

1. A storage system comprising:
   a first storage unit for storing information from a first server;
   a second storage unit for storing the information stored in said first storage unit; and
   a storage controller being coupled with said first storage unit, said second storage unit, said first server, and a second server, and being used to control said first storage unit and said second storage unit,
   wherein when an instruction for splitting is received from said first server, said storage controller reports end of the splitting to said first server, receives an instruction for backup from said second server, and then transfers information to a backup device from said second storage unit after copy of information from said first storage unit to said second storage unit ends,
   wherein a state of differential data is checked,
   wherein if the differential data exist representing that backup data is not reflected in the second storage unit, then data within a range to be backed up is fully read and transferred to the second storage unit and then transferred to a tape device serving as the backup device, and
   wherein if the differential data does not exist representing that all data within the range to be backed up is reflected in the second storage unit, then the data is read from the second storage unit and transferred to the tape device.

2. A storage system as set forth in claim 1, wherein data is transferred from said second storage unit to said backup device after copy of all data from said first storage unit to said second storage unit ends.

3. A backup method for a storage system having a first storage unit for storing data from a first server, a second storage unit for storing the data stored in said first storage unit, and a storage controller being connected with said first storage unit, said second storage unit, said first server, and a second server, and being used to control said first storage unit and said second storage unit, wherein said method comprising the steps of:
   causing said first server to issue an instruction for splitting between said first and second storage units to said storage controller;
   then causing said storage controller to report an end of the splitting to said first server before completing of copying from said first storage unit to said second storage unit; and
   then, when an instruction for backup is received from said second server during the copying from said first storage unit to said second storage unit, transferring data from said second storage unit to a backup device after the end of copy of the data from said first storage unit to said second storage unit based on controlling by said storage controller,
   checking state of differential data,
   wherein if the differential data exist representing that backup data is not reflected in the second storage unit, then data within a range to be backed up is fully read and transferred to the second storage unit and then transferred to a tape device serving as the backup device, and
   wherein if the differential data does not exist representing that all data within the range to be backed up is reflected in the second storage unit, then the data is read from the second storage unit and transferred to the tape device.

4. A backup method as set forth in claim 3, wherein when there is a request from said second server for transfer of data stored in said second storage unit to the backup device, the data is transferred to said backup device from said second storage unit after end of copy of the whole data into said second storage unit from said first storage unit.

5. A backup method for a storage system having a first storage unit for storing data from a first server, a second storage unit for storing the data stored in said first storage unit, and a storage controller being connected with said first storage unit, said second storage unit, said first server, and a second server, and being used to control said first storage unit and said second storage unit, wherein said method comprising the steps of:
   causing said first server to issue an instruction for splitting between said first and second storage units to said storage controller;
   then causing said storage controller to report an end of the splitting to said first server before completing of copying from said first storage unit to said second storage unit; and
   then, when an instruction for backup is received from said second server during the copying from said first storage unit to said second storage unit, transferring data from said second storage unit to a backup device after the end of copy of the data from said first storage unit to said second storage unit based on controlling by said storage controller,
   when there is a request for transfer of first information stored in said second storage unit and second information not stored in said second storage unit from said second storage unit to the backup device, copying said first information from said second storage unit into a memory that is connected with said storage controller and acts to store information and said second information is copied directly from said first storage unit into said memory, and said first information and said second information stored in said memory are transferred to said backup device.

6. A backup system comprising:
servers for storing data;
a first storage unit for storing data from said servers;
a second storage unit for copying the data stored in said first storage unit; and
a storage controller connected with said servers, said first storage unit, and said second storage unit and controlling said first and second storage units;
wherein when said storage controller receives an instruction for splitting between said first and second storage units from said servers, an end of splitting is reported to said servers before completing of copying from said first storage unit to said second storage unit, an instruction for backup is received from said servers during the copying from said first storage unit to said second storage unit, then data is copied from said first storage unit into said second storage unit, and after the end thereof the data is transferred from said second storage unit to the backup device based on controlling by said storage controller,
wherein a state of differential data is checked,
wherein if the differential data exist representing that backup data is not reflected in the second storage unit, then data within a range to be backed up is fully read and transferred to the second storage unit and then transferred to a tape device serving as the backup device, and
wherein if the differential data does not exist representing that all data within the range to be backed up is reflected in the second storage unit, then the data is read from the second storage unit and transferred to the tape device.

7. A backup system as set forth in claim 6, wherein said servers have a first server for issuing the instruction for splitting and a second server for issuing the instruction for backup.

8. A backup system as set forth in claim 6, wherein information is transferred from said second storage unit to said backup device after copy of whole data from said first storage unit to said second storage unit ends.

9. A backup system comprising:
servers for storing data;
a first storage unit for storing data from said servers;
a second storage unit for copying the data stored in said first storage unit; and
a storage controller connected with said servers, said first storage unit, and said second storage unit and controlling said first and second storage units;
wherein when said storage controller receives an instruction for splitting between said first and second storage units from said servers, an end of splitting is reported to said servers before completing of copying from said first storage unit to said second storage unit, an instruction for backup is received from said servers during the copying from said first storage unit to said second storage unit, then data is copied from said first storage unit into said second storage unit, and after the end thereof the data is transferred from said second storage unit to the backup device based on controlling by said storage controller,
when there is a request for transfer of first information stored in said second storage unit and second information not stored in said second storage unit from said second storage unit to the backup device, said first information is stored from said second storage unit into a memory that is connected with said storage controller and acts to store information and said second information is stored directly from said first storage unit into said memory, and then said first information and said second information stored in said memory are transferred to said backup device.

10. A storage system comprising:
a plurality of storage units; and
a storage controller for controlling said storage units,
wherein said storage units include first and second storage units, and
wherein said storage controller comprises;
(a) a memory,
(b) a first control portion connected with said memory, accepting splitting processing between said first and second storage units sent from a first server, and reporting an end of the splitting to said first server before completing of copying from said first storage unit to said second storage unit,
(c) a second control portion connected with said memory and accepting backup processing sent from a second server after said report of the end of the splitting during the copying from said first storage unit to said second storage unit,
(d) a third control portion connected with said storage units and said memory, and acting to copy data from said first storage unit to said second storage unit, and
(e) a fourth control portion connected with said memory and transferring data from said second storage unit to a backup device after the end of copy of data from said first storage unit to said second storage unit based on controlling by said storage controller,
wherein a state of differential data is checked,
wherein if the differential data exist representing that backup data is not reflected in the second storage unit, then data within a range to be backed up is fully read and transferred to the second storage unit and then transferred to a tape device serving as the backup device, and
wherein if the differential data does not exist representing that all data within the range to be backed up is reflected in the second storage unit, then the data is read from the second storage unit and transferred to the tape device.

11. A storage system as set forth in claim 10, wherein data is transferred from said second storage unit to said backup device after end of copy of whole data from said first storage unit to said second storage unit.

12. A storage system comprising:
a plurality of storage units; and
a storage controller for controlling said storage units,
wherein said storage units include first and second storage units, and
wherein said storage controller comprises:
(a) a memory,
(b) a first control portion connected with said memory, accepting splitting processing between said first and second storage units sent from a first server, and reporting an end of the splitting to said first server before completing of copying from said first storage unit to said second storage unit,
(c) a second control portion connected with said memory and accepting backup processing sent from a second server after said report of the end of the splitting during the copying from said first storage unit to said second storage unit,
(d) a third control portion connected with said storage units and said memory, and acting to copy data from said first storage unit to said second storage unit, and (e) a fourth control portion connected with said memory and transferring data from said second storage unit to a backup device after the end of copy of data from said first storage unit to said second storage unit based on controlling by said storage controller, when there is a request for transfer of first information stored in said second storage unit and second information not stored in said second storage unit from said second storage unit to the backup device, said first information is stored from said second storage unit into a second memory connected with said storage controller and acting to store information temporarily and said second information is stored directly from said first storage unit into said second memory, and wherein said first information and said second information stored in said second memory are transferred to said backup device.

\* \* \* \* \*